(12) United States Patent
Tsorng et al.

(10) Patent No.: US 11,692,610 B2
(45) Date of Patent: Jul. 4, 2023

(54) CABLE-CLAMP SYSTEM FOR AN ELECTRONIC COMPONENT WITHIN A TELECOMMUNICATIONS NETWORK

(71) Applicant: Quanta Computer Inc., Taoyuan (TW)

(72) Inventors: Yaw-Tzorng Tsorng, Taoyuan (TW); Ming-Lung Wang, Taoyuan (TW); Yuan-Chi Chang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 236 days.

(21) Appl. No.: 17/249,396

(22) Filed: Mar. 1, 2021

(65) Prior Publication Data

US 2022/0120332 A1    Apr. 21, 2022

Related U.S. Application Data

(60) Provisional application No. 63/094,123, filed on Oct. 20, 2020.

(51) Int. Cl.
   *F16G 11/10*    (2006.01)
   *F16L 3/10*     (2006.01)
   *H02G 7/05*     (2006.01)

(52) U.S. Cl.
   CPC .......... *F16G 11/105* (2013.01); *F16L 3/1033* (2013.01); *H02G 7/053* (2013.01)

(58) Field of Classification Search
   CPC ...... F16G 11/105; F16L 3/1033; H02G 7/053; H02G 3/32
   See application file for complete search history.

(56) References Cited

U.S. PATENT DOCUMENTS

| | | | | |
|---|---|---|---|---|
| 1,107,684 A | * | 8/1914 | Mallory | B21F 15/04 140/121 |
| 3,421,187 A | * | 1/1969 | Ryder | F16L 3/2235 D8/356 |
| 3,894,706 A | * | 7/1975 | Mizusawa | F16L 3/237 248/68.1 |
| 3,896,527 A | * | 7/1975 | Miller | A61M 25/02 24/DIG. 22 |
| 3,906,592 A | * | 9/1975 | Sakasegawa | H02G 3/32 248/68.1 |
| 4,264,047 A | * | 4/1981 | Nelson | F16L 3/12 24/339 |
| 4,395,009 A | * | 7/1983 | Bormke | H02G 3/32 174/157 |

(Continued)

*Primary Examiner* — David M Upchurch
(74) *Attorney, Agent, or Firm* — Nixon Peabody LLP (57) ABSTRACT

A cable-clamp system includes a clamp and a base structure located within an electronic chassis. The base structure includes an upper region, a first side region, and a second side region. The upper region includes a plurality of cable-receptor cavities for receiving the cables. The first side region includes an opening, and the second side region includes a slot. The clamp includes an engagement surface, a first end, and a second end. The first end includes a hook for insertion into the opening to allow pivoting movement of the clamp relative to the base structure. The second end includes a plunger for retention within the slot. When the clamp pivots downwardly to cause the engagement surface to engage the cables, the plunger is retained within the slot to maintain a clamping force on the cables between the base structure and the clamp.

19 Claims, 8 Drawing Sheets

(56) References Cited

U.S. PATENT DOCUMENTS

| | | | | |
|---|---|---|---|---|
| 4,775,121 A * | 10/1988 | Carty | F16L 3/2235 | 403/381 |
| 4,850,562 A * | 7/1989 | Mazzanti | A45C 3/004 | 211/124 |
| 4,858,870 A * | 8/1989 | Mazzanti | A45C 13/03 | 211/124 |
| 5,060,810 A * | 10/1991 | Jones | A47F 7/0035 | 248/68.1 |
| 5,389,082 A * | 2/1995 | Baugues | A61M 25/02 | 248/68.1 |
| 5,613,655 A * | 3/1997 | Marion | F16L 3/2235 | 24/339 |
| 5,742,982 A * | 4/1998 | Dodd | F16L 3/22 | 248/74.1 |
| 6,434,803 B1 * | 8/2002 | Spong | A47G 25/145 | 24/30.5 R |
| 6,602,016 B2 * | 8/2003 | Eckart | E02F 9/2275 | 403/337 |
| 7,457,506 B1 * | 11/2008 | Osborne, II | F16L 3/2235 | 385/136 |
| D584,353 S * | 1/2009 | Schreff | D19/135 | |
| D630,317 S * | 1/2011 | Wung | D24/128 | |
| 8,025,643 B2 * | 9/2011 | Bierman | A61M 25/02 | 604/174 |
| 8,959,828 B2 * | 2/2015 | Stahl | A01K 91/047 | 43/44.87 |
| 9,416,896 B1 * | 8/2016 | Kato | F16L 3/222 | |
| 9,888,603 B1 * | 2/2018 | Vargas | H02G 3/32 | |
| 10,302,228 B2 * | 5/2019 | Costigan | H02G 3/30 | |
| 10,309,553 B1 * | 6/2019 | Schwalbe | H02G 3/32 | |
| 10,612,696 B2 * | 4/2020 | Milner | F16L 3/221 | |
| 10,717,589 B2 * | 7/2020 | Lu | B65D 85/20 | |
| D930,831 S * | 9/2021 | Benton | D24/143 | |
| 2003/0005554 A1 * | 1/2003 | Nagayasu | B60R 16/0215 | 24/17 AP |
| 2003/0183733 A1 * | 10/2003 | Pisczak | H02G 7/053 | 248/229.23 |
| 2005/0006534 A1 * | 1/2005 | Shillings | F16L 3/223 | 248/68.1 |
| 2008/0105452 A1 * | 5/2008 | King | H02G 15/007 | 174/92 |
| 2010/0163278 A1 * | 7/2010 | Grelck | H05K 7/1491 | 174/135 |
| 2011/0099775 A1 * | 5/2011 | Chou | H02G 3/32 | 24/489 |
| 2011/0308046 A1 * | 12/2011 | Weiss | F16L 3/2235 | 24/122.6 |
| 2011/0315830 A1 * | 12/2011 | Eshima | B60R 16/0215 | 248/74.1 |
| 2013/0086773 A1 * | 4/2013 | Cude | A61M 39/08 | 24/132 R |
| 2015/0096802 A1 * | 4/2015 | Itani | B60R 16/0215 | 174/72 A |
| 2015/0176725 A1 * | 6/2015 | Wu | G03F 7/70341 | 355/30 |
| 2015/0192225 A1 * | 7/2015 | Vo | B23P 19/04 | 29/466 |
| 2016/0050904 A1 * | 2/2016 | Turner, Jr. | H02G 3/0418 | 49/464 |
| 2016/0076689 A1 * | 3/2016 | Kato | F16L 3/1091 | 248/636 |
| 2020/0099211 A1 * | 3/2020 | Kawaguchi | F16B 2/10 | |

* cited by examiner

CABLE-CLAMP SYSTEM FOR AN ELECTRONIC COMPONENT WITHIN A TELECOMMUNICATIONS NETWORK

CROSS-REFERENCE TO RELATED APPLICATIONS

This application claims priority under 35 U.S.C. § 119 to U.S. Provisional Application No. 63/094,123, entitled "Cable Clamp Mechanisms for 5G Outdoor," and filed on Oct. 20, 2020. The contents of that application are hereby incorporated by reference in their entirety.

FIELD OF THE INVENTION

The present invention relates generally to cable-clamp systems for a chassis of an electronic device and, more specifically, to cable-clamp systems for a 5G electronic device that allows cables, including fiber-optic cables, to easily bend and be fixed within the chassis to maintain an acceptable seal at regions where the cables exit the chassis.

BACKGROUND OF THE INVENTION

Cellular networks rely on various electronic devices, such as radios and antennas, that are mounted on support structures exposed to the environment. Some of those support structures are very tall, oftentimes at heights of 100 feet or more. As such, the electronic devices are exposed to inclement weather. Advancements in technology have led to 5G networks that require several interconnected devices having chasses that receive cables and wiring (hereinafter "cables"). Because of the need to permit cables to enter the chassis of the device, various methods have been utilized to help restrict water and debris from entering the chassis from the region around the cables.

In some instances, such as when the distance between interconnected electronic devices is large and the signal loss must be minimized, the cables used for connecting the electronic devices are fiber-optic cables. Fiber-optic cables have hard backings that require much more force to bend the cables, leading to a larger bending radius. In the confined space of a 5G electronic device, there is often very little area to bend any cable, especially a fiber-optic cable. Consequently, it is difficult to bend the cable to exit the chassis and maintain that same bending radius when the force (usually a manual bending force) is released from the cable. This can cause various problems, including creating gaps around the cable at the point where the cable exits the chassis.

As such, a need exists for an improved cable-clamp system that fits within the chassis of an electronic device (especially 5G electronic devices) for holding cables in fixed positions such that known cable-bending geometries can be maintained. The improved cable-clamp system preferably accommodates multiple cable sizes and provides a user-friendly way to fix the cables within the chassis.

SUMMARY OF THE INVENTION

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings and each claim.

According to one aspect of the present disclosure, a cable-clamp system for fixing cables within an electronic chassis comprises a base structure and a clamp. The base structure is located within the electronic chassis. The base structure includes an upper region, a first side region, and a second side region. The upper region is positioned between the first side region and the second side region. The upper region includes a plurality of cable-receptor cavities for receiving the cables. The first side region includes an opening, and the second side region includes a slot. The clamp includes an engagement surface, a first end, and a second end. The first end includes a hook configured for insertion into the opening to allow for pivoting movement of the clamp relative to the base structure. The second end includes a plunger configured for retention within the slot. In response to the clamp pivoting downwardly to cause the engagement surface to engage the cables, the plunger is retained within the slot to maintain a clamping force on the cables between the base structure and the clamp.

According to a configuration of the above implementation, each of the plurality of cable-receptor cavities has a curved surface for engaging a corresponding cable.

According to another configuration of the above implementation, each of the plurality of cable-receptor cavities has a depth measured into the base structure that is less than an outer diameter dimension of the corresponding cable.

According to a further configuration of the above implementation, the curved surface of at least one of the plurality of cable-receptor cavities has a different radius of curvature for receiving a cable of a different diameter.

In a further aspect of the above implementation, the base structure is a separate component that is attached to the electronic chassis.

In yet a further aspect of the above implementation, the opening is a rectangular-shaped opening and the hook has a rectangular-shaped cross-section.

In another aspect of the above implementation, the cable-clamp system further includes a threaded fastener. The clamp has a hole and the base structure includes a threaded bore. The threaded fastener is inserted through the hole and threadably engages the threaded bore to assist with maintaining the clamping force on the cables between the base structure and the clamp.

According to a further configuration of the above implementation, the plunger is a separate component from the clamp. The plunger includes a larger end for manual manipulation and a smaller protruding end for engagement within the slot.

According to another configuration of the above implementation, the plunger is inserted through an aperture in the second end of the clamp. The larger end is on one side of the aperture, and the smaller protruding end is on the other side of the aperture.

In yet a further aspect of the above implementation, the electronic chassis includes passageways allowing the cables to exit the electronic chassis. The base structure is located directly adjacent to the passageways.

Another aspect of the present disclosure includes an electronic device for a communications network for placement in an outside environment. The electronic device comprises a chassis, a base structure, and a clamp. The chassis includes electronic components connected to cables. The chassis has passageways allowing the cables to exit the chassis. The base structure is located within the chassis. The base structure includes an upper region positioned between a first side region and a second side region. The upper region includes a plurality of cable-receptor cavities through which the cables pass. The base structure includes a slot. The clamp is pivotably mounted to the base structure, and is capable of undergoing pivoting movement between an opened position and a closed position. The clamp includes an engagement surface that engages the cables when the clamp is in the closed position. The clamp further includes a plunger that is retained within the slot of the base structure to maintain a clamping force on the cables when the clamp is in the closed position.

According to another configuration of the above implementation, the clamp is detachable from the base structure.

According to another configuration of the above implementation, an end of the clamp includes a hook configured for insertion into an opening in the base structure to allow for the pivoting movement of the clamp relative to the base structure. The hook is removable from the opening to permit the clamp to be detached from the base structure.

According to another aspect of the above implementation, the base structure is located directly adjacent to the passageways in the chassis.

According to a further aspect of the above implementation, the base structure is a separate component that is attached to the chassis.

According to yet a further aspect of the above implementation, each of the plurality of cable-receptor cavities has a curved surface for engaging a corresponding cable.

According to another aspect of the above implementation, the curved surface of at least one of the plurality of cable-receptor cavities has a different radius of curvature for receiving a cable of a different diameter.

A further aspect of the present disclosure includes a method of assembling an electronic device that is exposed to an outside environment. The electronic device has a chassis and electronic components located within the chassis. The electronic components are electrically coupled to cables that exit the chassis. The method comprises inserting each of the cables into a corresponding cable-receptor cavity on a surface of a base structure and, after the inserting, connecting a hook on a first end of a clamp to an opening in the base structure. The method further includes pivoting the clamp around the hook to cause an engagement surface of the clamp to engage outer surfaces of the cables. While the engagement surface is engaging the outer surfaces of the cables, the method includes locking a second end of the clamp to the base structure to maintain a clamping force on the cables between the base structure and the clamp. The engagement surface is located between the first end and the second end of the clamp.

According to one aspect of the above implementation, the method further includes connecting the clamp to the base structure through a threaded fastener to help maintain the clamping force on the cables between the base structure and the clamp.

According to yet a further aspect of the above implementation, wherein the locking includes inserting a spring-loaded plunger on the second end of the clamp into a slot located on a side surface of the base structure.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of exemplary embodiments together with reference to the accompanying drawings. These drawings depict only exemplary embodiments, and are therefore not to be considered as limitations on the scope of the various embodiments or claims.

While the invention is susceptible to various modifications and alternative forms, specific implementations have been shown by way of example in the drawings and will be described in further detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Various embodiments are described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The various embodiments are not limited by the illustrated ordering of acts or events, as some acts may occur in different orders and/or concurrently with other acts or events. Furthermore, not all illustrated acts or events are required to implement a methodology in accordance with the present invention.

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Figure 1:
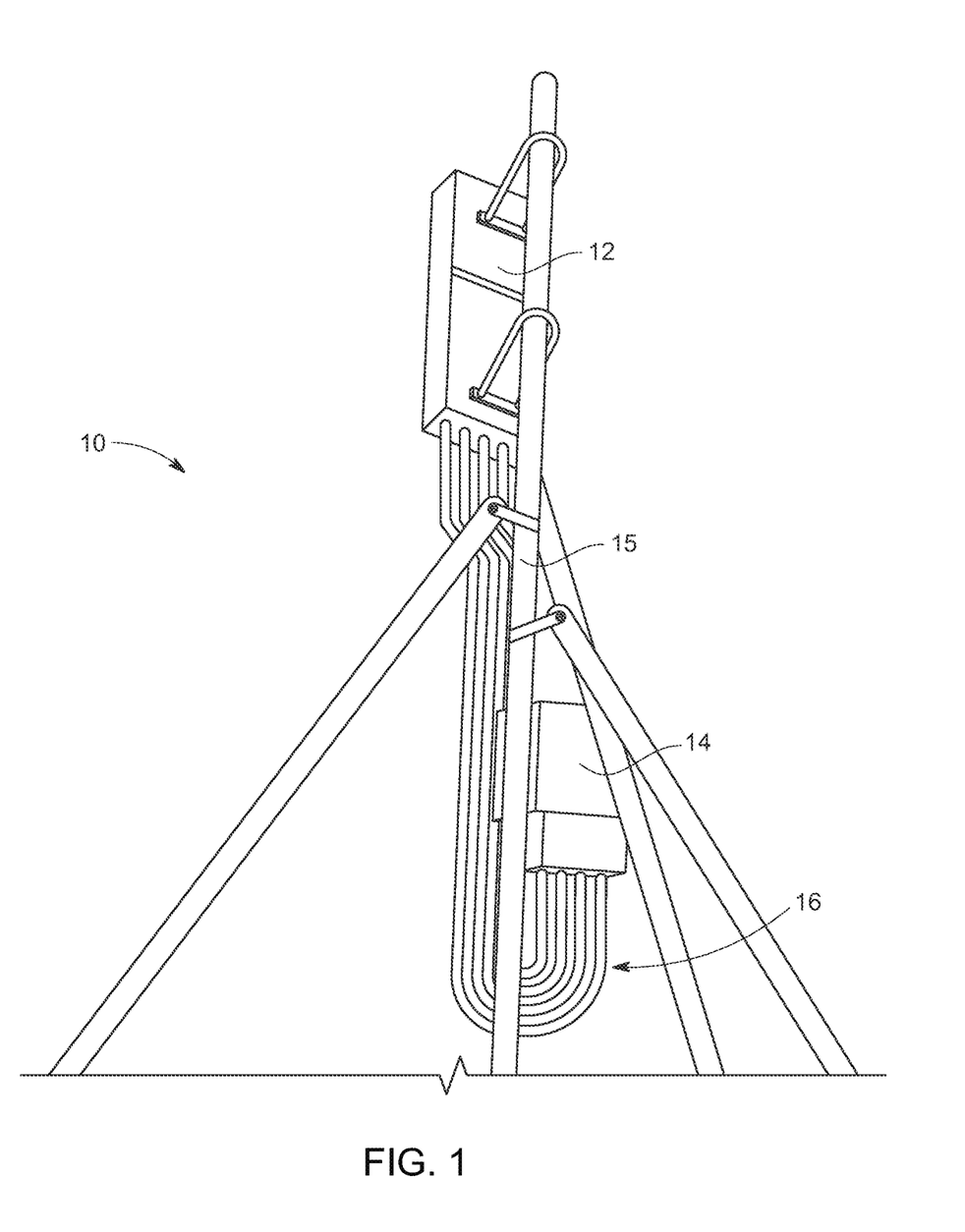
FIG. 1 illustrates two interconnected devices that are part of a 5G telecommunications network.

FIG. 1 illustrates components of a telecommunications network 10 (e.g., a 5G network) that includes multiple electronic devices 12, 14 in accordance with one embodiment of the present invention. The electronic devices 12, 14 are mounted on a pole structure 15 and exposed to the ambient environment. As one example, the electronic device 12 may be an antenna and the electronic device 14 may be a remote radio unit (RRU). The electronic devices 12, 14 are connected via cables 16. In some embodiments, such as the one shown in FIG. 1, the cables 16 are fiber-optic cables. In other embodiments, the cables 16 may include other cable types as well, such as RJ45 cables or USB cables.

Figure 2:
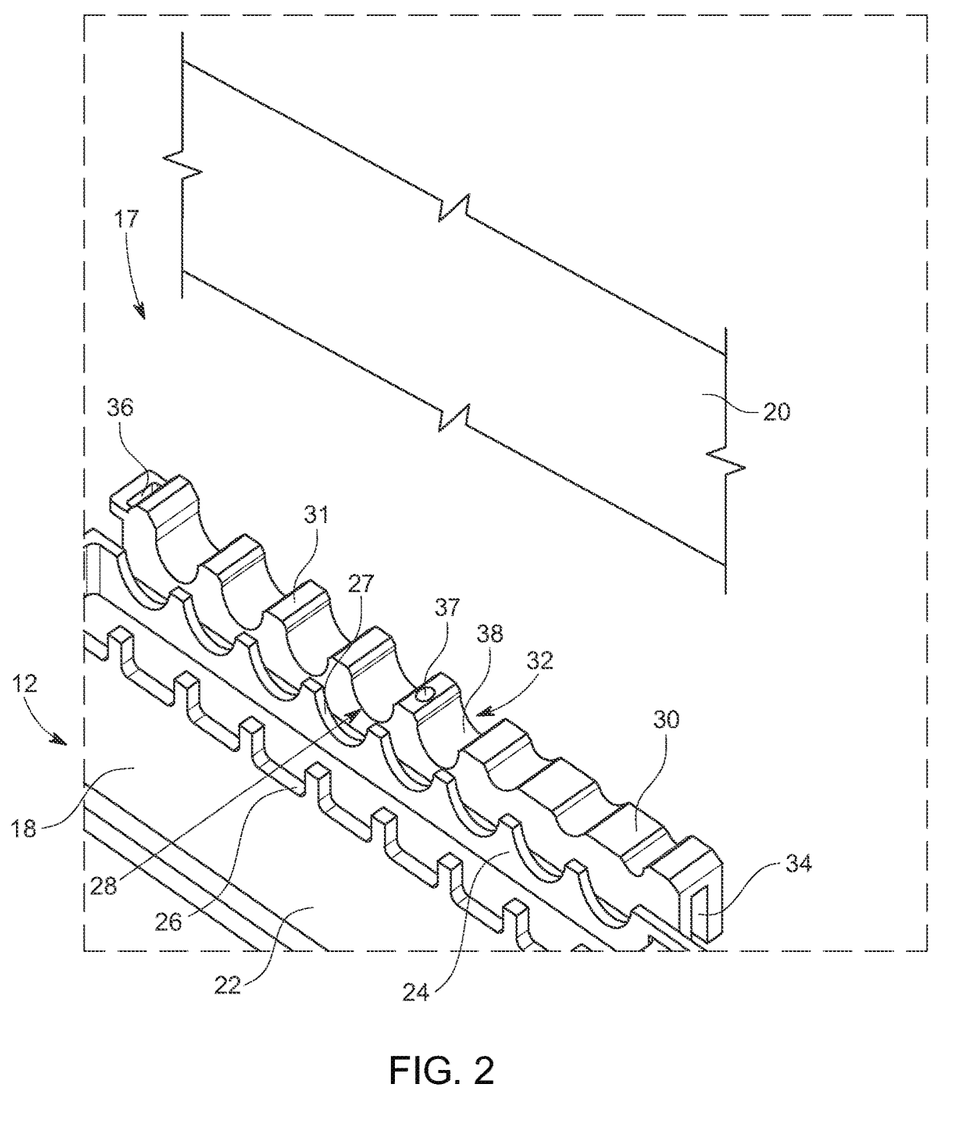
FIG. 2 is a partially exploded perspective view of one of the devices in FIG. 1 illustrating the base structure of the cable-clamp system.

FIG. 2 illustrates a portion of the electronic device 12 of FIG. 1 in more detail. The electronic device 12 includes a chassis 17 comprised of a base 18 and a cover 20. Only a portion of the cover 20 is shown in FIG. 2 to permit the internal components within the chassis 17 to be illustrated. The overall structure of the cover 20 is shown in more detail in FIG. 6, although the chassis 17 can be in various structural forms and sizes in accordance with the present disclosure.

The base 18 includes an outer wall 22 and an inner wall 24. The outer wall 22 and the inner wall 24 include, respectively, a plurality of through-holes 26, 27 (e.g., in the form of cut-outs) that form passageways 28 for the cables 16 (not shown in FIG. 2) to exit the electronic deice 12. In some embodiments, the regions between and adjacent to the outer wall 22 and the inner wall 24 may include sealing devices, such as rubber structures and/or cable glands, to inhibit water and debris from entering the chassis 17 via the passageways 28.

The chassis 17 also includes a cable-clamp base structure 30 (hereinafter the base structure 30) that helps to guide and restrict movement of the cables 16 (shown in FIG. 1), as described in more detail below. The base structure 30 includes an upper region 31 with a plurality of cable-receptor cavities 32, each of which is aligned with a corresponding one of the passageways 28. A slot 34 is located on a first side of the base structure 30. An opening 36 is located on a second side of the base structure 30. The base structure 30 also includes a threaded bore 37 that receives a threaded fastener, as described in more detail below relative to FIGS. 5-6.

Each of the cable-receptor cavities 32 is at least partially defined by a curved surface 38 on the base structure 30. The radius of curvature at the base of each of the curved surfaces 38 may be different to correspond with an outer diameter of a cable (not shown) that is to be routed through that particular cable-receptor cavity 32 and the corresponding passageway 28. The cables 16 used in the electronic devices 12 typically have an outer diameter between about 5 mm and about 9 mm, although others sizes may be used as well. Further, the depth of the cable-receptor cavities 32 as measured from the uppermost surface of the upper region 31 may be different to accommodate the cables 16 of different diameters. Preferably, the depth of the cable-receptor cavity 32 is slightly less than outer diameter of the corresponding cable 16, such that the outer surface of the cable extends slightly above the upper region 31. As such, the base structure 30 is preferably configured such that the outer surfaces of all of the cables 16 within the cable-receptor cavities 32 are at substantially the same height above the base structure 30.

Figure 3A:
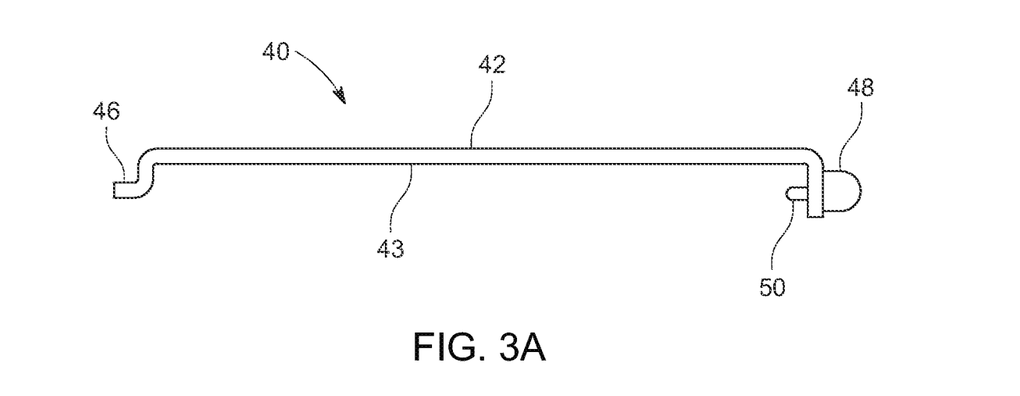
FIG. 3A is a side view of a clamp used in the cable-clamp system.
Figure 3B:
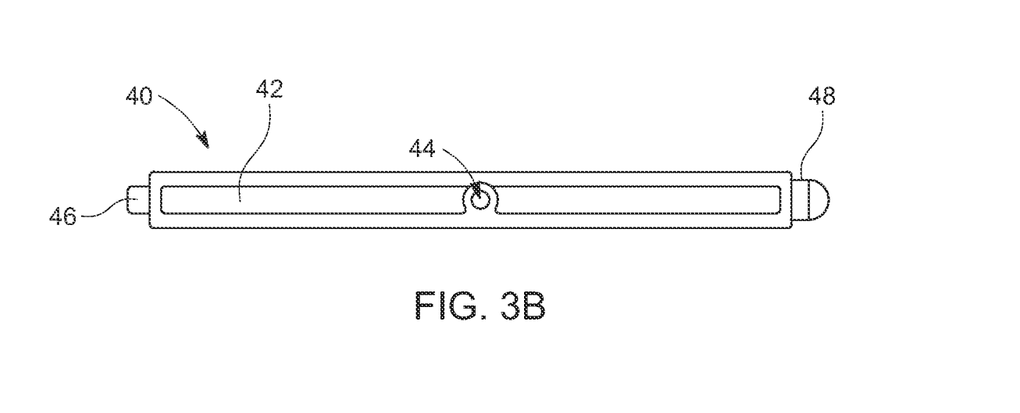
FIG. 3B is a top view of the clamp used of FIG. 3A.

FIGS. 3A and 3B illustrate a clamp 40 that is to be used with the base structure 30 of FIG. 2. The clamp 40 includes an elongated middle region 42 with a lower surface 43 for engaging the cables 16, as described below in FIGS. 5-7. The elongated middle region 42 includes an opening 44 through which a fastener may pass. One end of the clamp 40 includes a hook 46. The other end of the clamp 40 includes a plunger 48 with an inwardly protruding end 50. In some embodiments, the plunger 48 may be a separate piece from the clamp 40 that extends through an aperture (not shown) at the end of the clamp 40. The large end of the plunger 48 that can be manually grasped is on one side of the aperture and the protruding end 50 is on the opposing side of the aperture. In some embodiments, the plunger 48 is spring-loaded and biased to the position shown in FIGS. 3A-3B. When actuated, the plunger 48 can be pulled away from the clamp 40 (i.e., pulled to the right in FIGS. 3A-3B) and, under the spring force, is urged back to the position shown in FIGS. 3A-3B.

Figure 4:
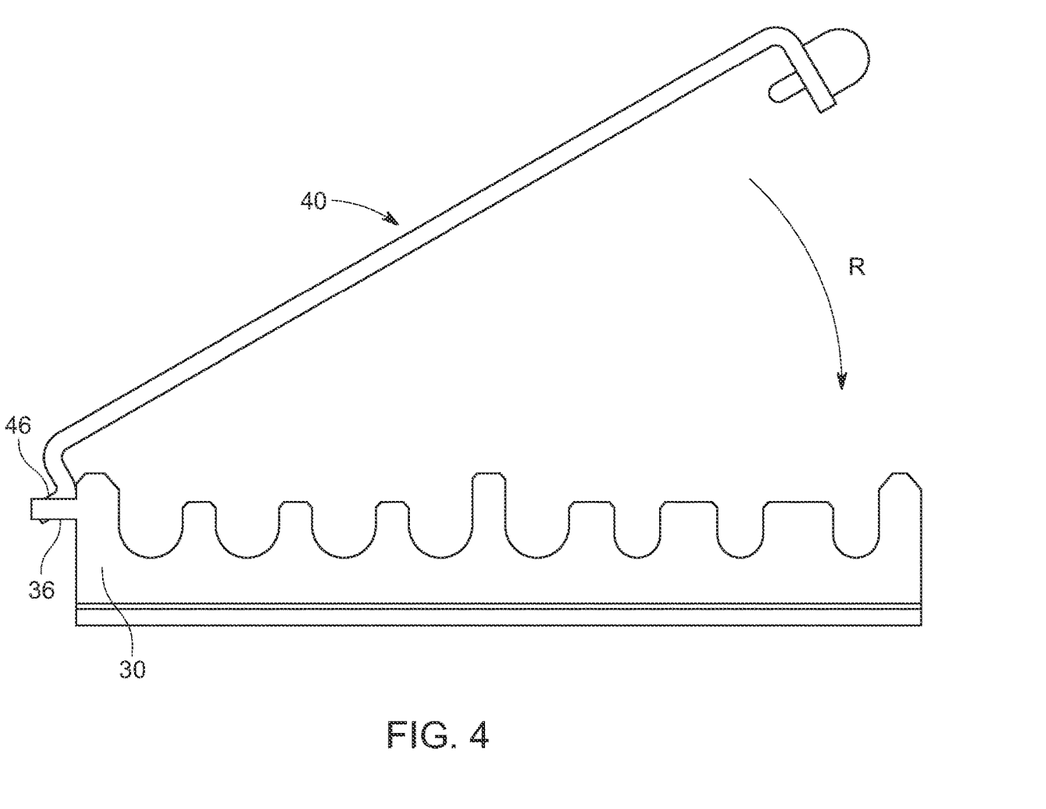
FIG. 4 illustrates the clamp of FIGS. 3A-3B engaging the base structure of the cable-clamp system.

FIG. 4 illustrates how the base structure 30 and the clamp 40 are interconnected in operation. The hook 46 of the clamp 40 is inserted into the opening 36 of the base structure 30, creating a pivotable-mounting arrangement between the clamp 40 and the base structure 30. The arrow R indicates the rotational movement of the clamp 40 from the opened position, shown in FIG. 4, toward the closed position, which is shown FIGS. 5-7 below. In one embodiment, the opening 36 has a rectangular shape and the hook 46 has a rectangular-shaped cross-section, allowing it to fit within the opening 36. The present disclosure contemplates other types of pivotable-mounting connections between the base structure 30 and the clamp 40. In some embodiments, such as the one shown in FIG. 4, the clamp 40 is detachable from the base structure 30.

Figure 5:
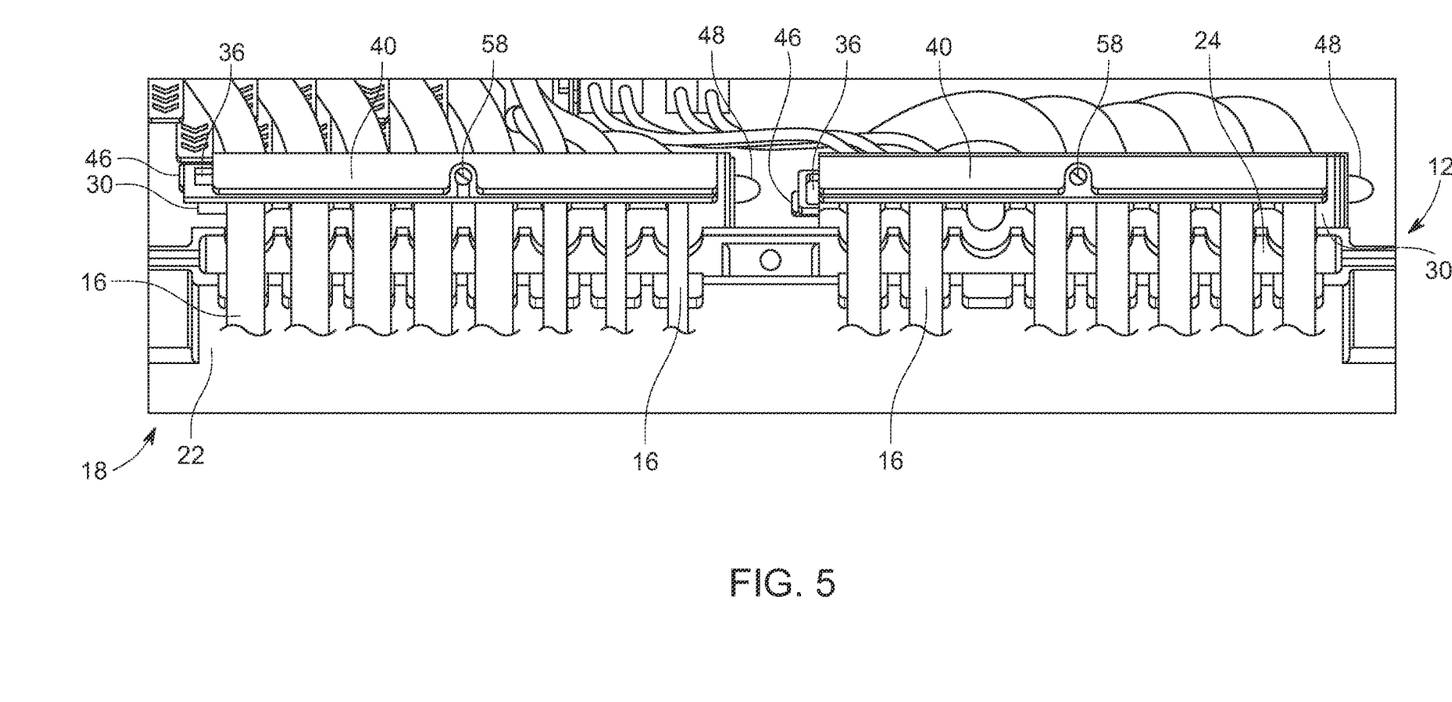
FIG. 5 is a perspective view of the cable-clamp system in use with several cables.

FIG. 5 illustrates two sets of the base structures 30 and the clamps 40 in use. The cables 16 (fifteen are shown) extend through the passageways 28 (FIG. 2) defined by the outer wall 22 and the inner wall 24 of the base 18 of the electronic device 12. The cables 16 are also routed through the cable-receptor cavities 32 (FIG. 2) of the base structures 30, which are located adjacent to the outer wall 22 and the inner walls 24. For each of the two base structures 30, the hook 46 of the corresponding clamp 40 has been inserted into the opening 36 of the base structure 30, as shown in FIG. 4. After the cables 16 are placed in their assigned cable-receptor cavities 32, the clamp 40 is rotated downward from the opened position and the plunger 48 is pulled outwardly away from the clamp 40. When the clamp 40 reaches the closed position in which the lower surface 43 (FIG. 3A) is engaging the outer surfaces of the cables 16, the plunger 48 is released, such that its protruding end 50 (FIG. 3A) engages the slot 34 (FIG. 2). Consequently, the clamp 40 is now locked into position over the base structure 30 to maintain a clamping force on the cables 16 between the base structure 30 and the clamp 40. To assist in maintaining the clamping force on the cables 16, a screw 58 is inserted through the opening 44 (FIG. 3B) and threadably engages the threaded bore 37 (FIG. 2) of the base structure 30.

The clamping force is enough to hold the cables 16, including more rigid optical fiber cables, in a fixed position, despite the cables 16 being subjected to various degrees and directions of manual bending within the electronic device 12. When the cables 16 exit the electronic device 12 through the passageways 28, the cable-clamp system comprised of the base structure 30 and the clamp 40 helps to maintain the cables 16 in an aligned configuration so that gaps around the cables 16 can be minimized, which leads to a better seal around the cables 16. Consequently, the likelihood that water and contamination from the ambient environment enter the electronic device 12 is reduced, leading to higher operational reliability for the electronic device 12.

If the cables 16 need to be released, the screw 58 is removed and the plunger 48 is actuated to release it from the base structure 30. The clamp 40 then rotates upward toward the open position by pivoting around the connection between the hook 46 and the opening 36. The cables 16 can then be pulled away from the base structure 30.

Figure 6:
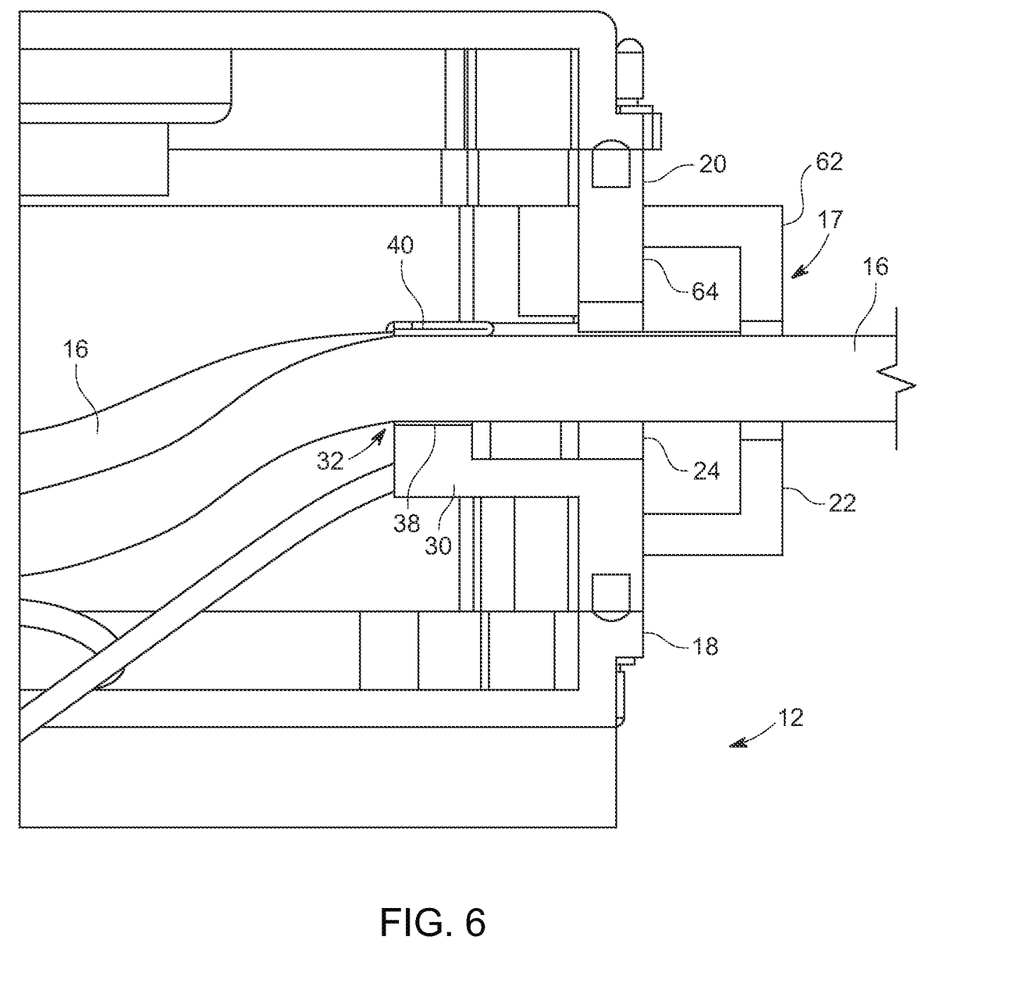
FIG. 6 is a side view of the cable-clamp system in use with several cables.

FIG. 6 illustrates a side view of the electronic device 12 in FIG. 5 with the cover 20 now in place. The chassis 17 of the electronic device 12 includes the base 18 and the cover 20. Like the outer wall 22 and the inner wall 24 of the base 18, the cover 20 also includes an outer wall 62 and an inner wall 64. The cables 16 extend outwardly from the chassis 17 and into the ambient environment at the interface between the cover 20 and the base 18. As shown in FIG. 6, the base structure 30 is formed as part of the base 18 of the chassis 17. When the cables 16 rest against the curved surface 38 within the cable-receptor cavities 32 of the base structure 30, the clamp 40 is engaged against the cables 16 to retain them in a fixed position.

Figure 7:
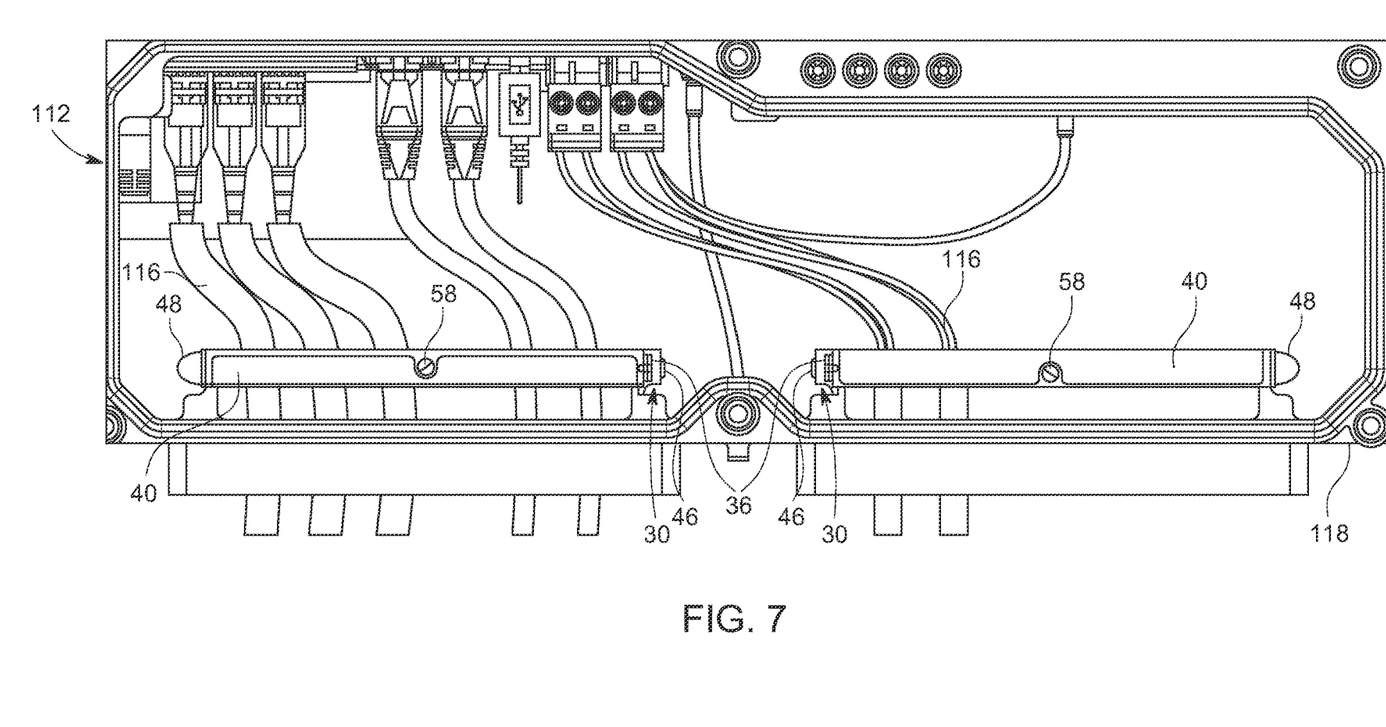
FIG. 7 is a top of the cable-clamp system in use on a different electronic device.

FIG. 7 illustrates the versatility of the cable-clamp system, in that the base structure 30 and the clamp 40 are used in a different electronic device 112 having a different base 118 and different cover (not shown). The same base structure 30 and the same clamp 40 described previously are used to hold different cables 116 in fixed positions within the electronic device 112. Unlike the embodiment shown in the FIG. 5, the left base structure 30 and the left clamp 40 have been rotated 180 degrees, such that the plunger 48 is now located on the outboard side of the electronic device 112. The pivoting connections defined by the insertion of the hook 46 into the opening 36 are now in the inboard region of the electronic device 112 for each cable-clamp system. The screws 58 are used to help maintain the clamping force on the cables 116. Consequently, the base structure 30 and the clamp 40 can be used in various types of electronic devices 12, 112 and with different cable configurations within each type of the electronic devices 12, 112.

Figure 8:
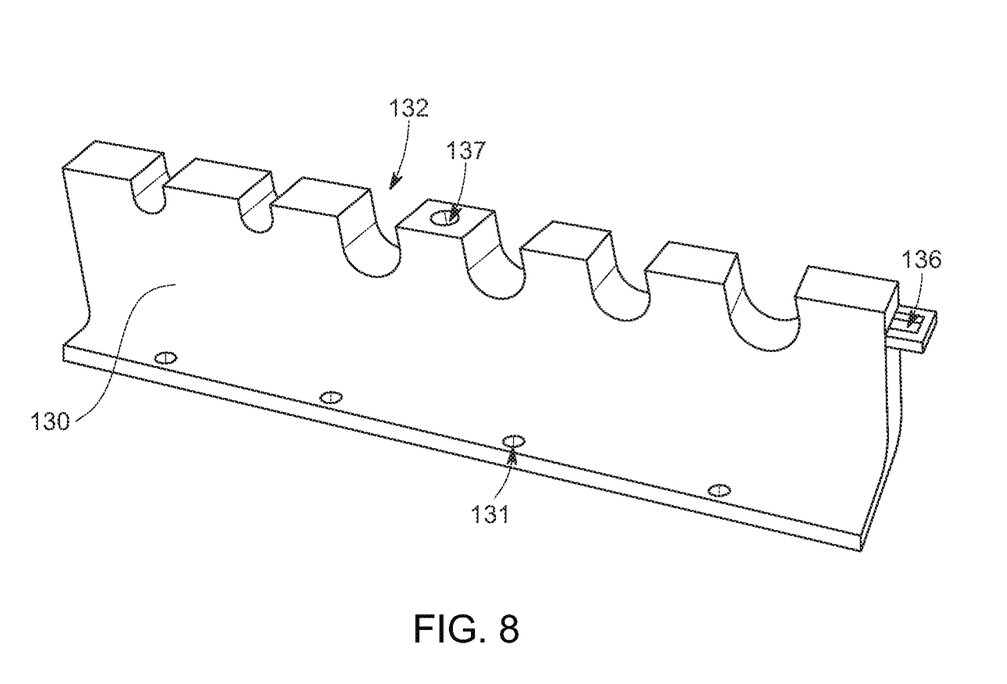
FIG. 8 illustrates a modular base structure for a cable-clamp system that can be mounted within various electronic devices.

FIG. 8 illustrates another embodiment of the present disclosure that provides enhanced modularity. Unlike the prior embodiments having a base structure 30 that is integrated as a part of the chassis 17, FIG. 8 illustrates a removable base structure 130 that can be attached to the chassis of an electronic device by threaded fasteners that extend through holes 131 at the bottom of the base structure 130. The base structure 130 includes cable-receptor cavities 132 of different sizes and shapes to match the cables that are to be used in the electronic device. The base structure 130 includes an opening 136 at one side for mating with the hook 46 of the clamp 40 (not shown). Though not shown, the opposing side of the base structure 130 includes a slot for mating with the plunger 48 of the clamp 40 (not shown), as previously described.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A cable-clamp system for fixing cables within an electronic chassis, comprising:
  a base structure located within the electronic chassis, the base structure including an upper region, a first side region, and a second side region, the upper region positioned between the first side region and the second side region, the upper region including a plurality of cable-receptor cavities for receiving the cables, the first side region including an opening, the second side region including a slot, the base structure further including a threaded bore;
  a clamp including an engagement surface, a first end, and a second end, the first end including a hook configured for insertion into the opening of the first side region to allow for pivoting movement of the clamp relative to the base structure, the second end including a plunger configured for retention within the slot of the second side region, the clamp further including a hole; and a threaded fastener configured to be inserted through the hole of the clamp and threadably engage the threaded bore of the base structure;

wherein, in response to the clamp pivoting downwardly to cause the engagement surface to engage the cables, the plunger is retained within the slot to maintain a clamping force on the cables between the base structure and the clamp; and wherein the threaded fastener assists with maintaining the clamping force on the cables between the base structure and the clamp.

2. The cable-clamp system of claim 1, wherein each of the plurality of cable-receptor cavities has a curved surface for engaging a corresponding cable.

3. The cable-clamp system of claim 2, wherein each of the plurality of cable-receptor cavities has a depth measured into the base structure that is less than an outer diameter dimension of the corresponding cable.

4. The cable-clamp system of claim 2, wherein the curved surface of at least one of the plurality of cable-receptor cavities has a different radius of curvature than the curved surfaces of the other cable-receptor cavities for receiving a cable of a different diameter.

5. The cable-clamp system of claim 1, wherein the base structure is separately attached to the electronic chassis.

6. The cable-clamp system of claim 1, wherein the opening is a rectangular-shaped opening and the hook has a rectangular-shaped cross-section.

7. The cable-clamp system of claim 1, wherein the plunger is a separate component from the clamp, the plunger including a larger end for manual manipulation and a smaller protruding end for engagement within the slot.

8. The cable-clamp system of claim 7, wherein the plunger is inserted through an aperture in the second end of the clamp, the larger end disposed on one side of the aperture, the smaller protruding end disposed on the other side of the aperture.

9. The cable-clamp system of claim 1, wherein the electronic chassis includes passageways allowing the cables to exit the electronic chassis, the base structure located directly adjacent to the passageways.

10. An electronic device for a communications network for placement in an outside environment, comprising:
a chassis including one or more electronic components connected to cables, the chassis having passageways allowing the cables to exit the chassis;
a base structure within the chassis, the base structure including an upper region being positioned between a first side region and a second side region, the upper region including a plurality of cable-receptor cavities through which the cables pass, the base structure including a slot; and
a clamp pivotably mounted to the base structure and capable of undergoing pivoting movement between an opened position and a closed position, the clamp including an engagement surface that engages the cables when the clamp is in the closed position, the clamp further including a plunger that is retained within the slot of the base structure to maintain a clamping force on the cables when the clamp is in the closed position.

11. The electronic device of claim 10, wherein the clamp is detachable from the base structure.

12. The electronic device of claim 11, wherein an end of the clamp includes a hook configured for insertion into an opening in the base structure to allow for the pivoting movement of the clamp relative to the base structure, the hook being removable from the opening to permit the clamp to be detached from the base structure.

13. The electronic device of claim 10, wherein the base structure is located directly adjacent to the passageways in the chassis.

14. The electronic device of claim 10, wherein the base structure is separately attached to the chassis.

15. The electronic device of claim 10, wherein each of the plurality of cable-receptor cavities has a curved surface for engaging a corresponding one of the cables.

16. The electronic device of claim 15, wherein the curved surface of at least one of the plurality of cable-receptor cavities has a different radius of curvature than the curved surfaces of the other cable-receptor cavities for receiving a cable of a different diameter.

17. A method of assembling an electronic device that is exposed to an outside environment, the electronic device having a chassis and one or more electronic components located within the chassis, the one or more electronic components electrically coupled to cables that exit the chassis, the method comprising:
inserting each of the cables into a corresponding cable-receptor cavity on a surface of a base structure;
after the inserting, connecting a hook on a first end of a clamp to an opening in the base structure;
pivoting the clamp around the hook to cause an engagement surface of the clamp to engage outer surfaces of the cables; and
while the engagement surface is engaging the outer surfaces of the cables, locking a second end of the clamp to the base structure to maintain a clamping force on the cables between the base structure and the clamp, the engagement surface located between the first end and the second end of the clamp.

18. The method of claim 17, further including, connecting the clamp to the base structure through a threaded fastener to help maintain the clamping force on the cables between the base structure and the clamp.

19. The method of claim 17, wherein the locking includes inserting a spring-loaded plunger on the second end of the clamp into a slot located on a side surface of the base structure.

* * * * *